United States Patent
Patrick et al.

(10) Patent No.: US 8,047,670 B2
(45) Date of Patent: Nov. 1, 2011

(54) BOOKLIGHT FOR A PROTECTIVE COVER OF AN EREADER

(75) Inventors: Mish Patrick, Odenton, MD (US); Jim Ward, Ashburn, VA (US); Adam Ashley, Odenton, MD (US)

(73) Assignee: M-Edge Accessories, LLC, Odenton, MD (US)

( * ) Notice: Subject to any disclaimer, the term of this patent is extended or adjusted under 35 U.S.C. 154(b) by 0 days.

(21) Appl. No.: 12/964,815

(22) Filed: Dec. 10, 2010

(65) Prior Publication Data
US 2011/0069475 A1 Mar. 24, 2011

Related U.S. Application Data

(63) Continuation of application No. 12/541,897, filed on Aug. 14, 2009.

(60) Provisional application No. 61/138,520, filed on Dec. 17, 2008, provisional application No. 61/183,094, filed on Jun. 1, 2009.

(51) Int. Cl.
*F21V 33/00* (2006.01)
(52) U.S. Cl. .......................................... 362/98; 362/188
(58) Field of Classification Search ............... 362/98–99, 362/188, 191, 190
See application file for complete search history.

(56) References Cited

U.S. PATENT DOCUMENTS

| | | | |
|---|---|---|---|
| 1,202,498 A | 10/1916 | Findley | |
| 2,161,872 A | 6/1939 | Kostal | |
| 2,524,461 A | 12/1947 | McDowell | |
| 2,561,744 A | 8/1948 | Langdon et al. | |
| 2,957,073 A | 10/1960 | Legge | |
| 3,309,544 A | 3/1967 | Lawson | |
| 3,381,122 A | 4/1968 | Boyle, Jr. | |
| 3,823,312 A | 7/1974 | Weinstein | |
| 4,680,681 A | 7/1987 | Fisherman et al. | |
| 5,122,937 A | 6/1992 | Stoudemire | |
| 5,176,438 A | 1/1993 | Fisherman | |
| 5,180,220 A | 1/1993 | Van Kalsbeek | |

(Continued)

FOREIGN PATENT DOCUMENTS

DE 20 2008 014 294 4/2009

(Continued)

OTHER PUBLICATIONS

M-Edge e-Luminator2 Booklight for Amazon Kindle as shown at http://www.amazon.com/gp/product/B002HIE10S/ref=pd_1po_k2_dp_sr_3?pf_rd_p=486539851&pf_rd_s=1po-top-stripe-1&pf_rd_t=201&pf_rd_i=B0021GH4KS&pf_rd_m=ATVPDKIKX0DER&pf_rd_r=17109XFJ40HS0MCWNCZB, Aug. 18, 2011.

(Continued)

*Primary Examiner* — Robert May
(74) *Attorney, Agent, or Firm* — Drinker Biddle & Reath LLP

(57) ABSTRACT

A booklight for a protective cover for an eReader, wherein the protective cover includes a pocket for supporting the booklight, the booklight including a base, a light housing assembly having a light source, a manipulatable neck coupled between the base and the light housing assembly, and a base tab rotatably coupled to the base, wherein the base tab includes a first end rotatably coupled to the base tab, and a second end extending from the first end, wherein the second end is a free end, and wherein at least a portion of the free end is configured to engage the pocket of the protective cover.

17 Claims, 24 Drawing Sheets

U.S. PATENT DOCUMENTS

| | | | |
|---|---|---|---|
| 5,688,037 A | | 11/1997 | Chen |
| 5,695,271 A | | 12/1997 | Zeller |
| 5,810,604 A | * | 9/1998 | Kopp et al. .................. 434/317 |
| 5,884,888 A | | 3/1999 | Grimes, III et al. |
| 5,993,022 A | | 11/1999 | Neyer et al. |
| 6,022,119 A | | 2/2000 | Booty, Jr. |
| 6,851,822 B2 | * | 2/2005 | Herrera .......................... 362/99 |
| 7,077,596 B1 | | 7/2006 | Bianco et al. |
| 7,153,212 B1 | | 12/2006 | Karten et al. |
| 7,163,306 B1 | | 1/2007 | Major et al. |
| 7,490,948 B2 | * | 2/2009 | Fisherman et al. ............. 362/98 |
| D600,852 S | | 9/2009 | Clepper et al. |
| 7,748,634 B1 | * | 7/2010 | Zehr et al. ..................... 235/492 |
| 2001/0026445 A1 | | 10/2001 | Naghi et al. |
| 2003/0016532 A1 | | 1/2003 | Reed |
| 2003/0081407 A1 | | 5/2003 | Bennett, Jr. |
| 2003/0179572 A1 | | 9/2003 | Schnell |
| 2003/0193795 A1 | | 10/2003 | Brown |
| 2006/0208477 A1 | | 9/2006 | Sandy |
| 2007/0115672 A1 | | 5/2007 | Nelson et al. |
| 2007/0208226 A1 | | 9/2007 | Grey et al. |

FOREIGN PATENT DOCUMENTS

| | | |
|---|---|---|
| FR | 2 555 291 | 5/1985 |
| GB | 25211 | 3/1912 |
| GB | 2 159 264 | 11/1985 |
| WO | WO 2007/102157 | 9/2007 |

OTHER PUBLICATIONS

Sony eBook Reader Pocket (PRS-300) Cover with Light as shown at http://www.whsmith.co.uk/CatalogAndSearch/ProductDetails.aspx?productID=34171059, Aug. 18, 2011.

Sony PRS ACL1 Reader Digital Book Cover as shown at http://www.shopzilla.com/sony-prsaell-reader-digital-book-cover-with/983029583/compare, Aug. 19, 2011.

Illuminating Book Cover as shown at http://www.hammacher.com/Product/77939?cm_ven=HS&cm_cat=ProductSEM&cm_Adwords&cm_ite=77939&OVMTC=Broad&site=&creative=4305694037&OVKEY=book%20cover%20light, Aug. 18, 2011.

Sony PRS-ACL1 Reader Digital Book Cover with Light as shown at http://walmart.com/ip/Sony-PRS-ACL1-Reader-Digital-Book-Cover-with-Light/107, Aug. 18, 2011.

Sony PRS-ACL1 Reader Digital Book Cover with Light as shown at http://www.bhphotovideo.com/c/product/589070-REG/Sony_PRSACL1_Rea..., Aug. 18, 2011.

Sony PRS-ACL1 Reader Digital Book Cover with Light as shown at http://sonystyle.com/webapp/wes/stores/servlet/ProductDisplay?catalogID=10551&st..., Dec. 9, 2009.

* cited by examiner

60

US 8,047,670 B2

BOOKLIGHT FOR A PROTECTIVE COVER OF AN EREADER

CLAIM OF PRIORITY UNDER 35 U.S.C. §119

The present Application for Patent claims priority to Provisional Application No. 61/138,520 entitled "Booklight" filed Dec. 17, 2008, and Provisional Application No. 61/183,094 entitled "BOOKLIGHT FOR AN eREADER JACKET" filed Jun. 1, 2009, and is a continuation of U.S. patent application Ser. No. 12/541,897, entitled "BOOKLIGHT FOR A PROTECTIVE COVER OF AN eREADER" filed on Aug. 14, 2009, which are assigned to the assignee hereof and hereby expressly incorporated by reference in their entirety herein.

FIELD OF THE INVENTION

The present invention is directed toward a booklight for an eReader, and more specifically, to a booklight for a protective cover or jacket of an eReader.

BACKGROUND OF THE INVENTION

Recently, eReaders such as electronic books have become increasingly popular. Such eReaders include a display, such as a liquid crystal display (LCD), for displaying the contents or text of an electronic book.

In many eReaders, the display does not include a backlight. Instead, the eReader relies on ambient light for rendering the text of the eReader visible to the user. In instances in which sufficient levels of ambient light are present, the user may not have any difficulty reading the display of the eReader. However, in other instances, a user may find it difficult to view the text of the eReader in some conditions in which the level of ambient light is not sufficient to illuminate the screen of the eReader.

Some common approaches to improve lighting include using conventional booklights designed, for example, for hardcover books. Such conventional booklights often include spring loaded clamps that may be suitable for attaching a portable light to a conventional hardcover book. However, such conventional booklights may be difficult to attach to an eReader and in some cases may result in damage to, or scratching of, the housing or screen of the eReader.

Moreover, an eReader is designed to be lightweight, portable, and compact. However, such conventional booklights can be awkward and cumbersome to carry or transport along with the eReader. As such, a user may not wish to carry these conventional devices with them, thereby leaving the user with no supplemental light source in instances in which ambient light is limited or reduced.

Also, many conventional booklights do not uniformly light the display of the eReader, which may lead to fatigue or strain on the user when trying to read an eReader under low ambient light conditions.

SUMMARY OF THE INVENTION

The present invention can address and may solve these and other problems with the conventional devices by providing a booklight for an eReader, and more specifically, to a booklight for an eReader jacket.

These problems and others are addressed by the present invention, a first exemplary embodiment of which is directed to a booklight for a protective cover for an eReader, wherein the protective cover includes a pocket for supporting the booklight, the booklight including a base, a light housing assembly having a light source, a manipulatable neck coupled between the base and the light housing assembly, and a base tab rotatably coupled to the base, wherein the base tab includes a first end rotatably coupled to the base tab, and a second end extending from the first end, wherein the second end is a free end, and wherein at least a portion of the free end is configured to engage the pocket of the protective cover.

Another exemplary embodiment is directed to a booklight for a protective cover for an eReader, wherein the protective cover includes a pocket for supporting the booklight, the booklight comprising a base, a light housing assembly having a light source, a manipulatable neck coupled between the base and the light housing assembly, and a base tab coupled to the base, wherein the base tab includes a first end coupled to the base tab, and a second end extending from the first end, wherein the second end is a free end, and wherein at least a portion of the free end is configured to engage the pocket of the protective cover.

Another exemplary embodiment is directed to a cover assembly for an eReader, wherein the cover assembly includes a protective cover, and a booklight removably secured to the protective cover, wherein the protective cover includes a first cover having an interior and an exterior surface, a second cover having an interior and an exterior surface, a spine connecting the first cover to the second cover, wherein the first cover and the second cover are pivotable with respect each other about the spine, a mounting device for securing the eReader on the interior surface of one of the first cover and the second cover, and a booklight pocket on the interior surface of one of the first cover and the second cover, and wherein the booklight comprises a base, a light housing assembly having a light source, a manipulatable neck coupled between the base and the light housing assembly, and a base tab coupled to the base, wherein the base tab includes a first end coupled to the base tab, and a second end extending from the first end, wherein the second end is a free end, and wherein at least a portion of the free end engages the booklight pocket of the protective cover, thereby removably securing the booklight to the protective cover.

In this manner, the present invention provides a booklight for providing sufficient light for a user to view the text of an eReader under various ambient light conditions. Thus, in instances in which a user may find it difficult to view the text of the eReader because the level of ambient light is not sufficient to illuminate the screen of the eReader, the user can easily view the text of the eReader.

Additionally, the present invention provides a booklight that is specially designed for use with an eReader, and more particularly, for use with a variety of protective jackets or covers for an eReader. The exemplary booklight is lightweight, durable, and compact, and can be easily collapsed and stored in a protective jacket or cover of the eReader, thereby providing a booklight that is easily and conveniently carried or transported along with the eReader. In this manner, a user of an eReader can easily and conveniently illuminate the screen of the eReader in instances in which the level of ambient light is limited or reduced.

The present invention also provides a booklight having a flexible neck such that the user can easily and conveniently direct the light toward the screen of the eReader, for example, at an optimum angle to reduce or prevent glare, thereby improving visibility, reducing eye strain and fatigue, and providing adjustability and adaptability for a variety of eReader types, sizes, and styles.

The present invention also provides a booklight having a superbright light source, such as a light emitting diode (LED)

which require little power to operate and can maximize the lifespan of the light source, and indeed, may never need replacing.

Aspects of the present invention can be configured to use, for example, a single, standard AAA battery that can provide, for example, equal to or greater than 20 hours of operating time.

The present invention also provides a booklight having improved lighting characteristics, such as increased uniform lighting. For example, the present invention can provide a booklight including a mirrored reflector and optical quality dome lens for uniformly distributing the light from the light source toward the eReader screen.

The present invention also can provide a booklight having, for example, multiple light intensity settings for the light source. For example, an aspect can include a three-position switch including two light intensity settings (for example, a 'high' setting and a 'low' setting) and an 'off' setting. Other aspects can include three or more light intensity settings. In this manner, the present invention provides a booklight that can provide ample illumination in various ambient light conditions, thereby providing greater flexibility and adjustability for the user. Additionally, the present invention provides a booklight that can minimize or reduce the power consumption, thereby extending the battery life, for example, by reducing the light intensity in instances in which a greater amount of ambient light is available.

The present invention is configured to work seamlessly with a protective jacket or cover for an eReader.

An exemplary embodiment of the booklight includes a slim support arm or base sized to match a pocket sewn or formed in an interior surface of a protective cover for an eReader. The pocket can be configured to receive a base of the booklight such that the booklight can be easily and effortlessly carried with the eReader, for example, at all times. The booklight pocket can be conveniently located behind the eReader such that the support arm does not interfere with the use of the eReader. The exemplary embodiments can be configured to receive and seamlessly integrate and store the booklight within the protective cover, for example, in the spine of the protective cover when the eReader is not in use. In this manner, a lightweight, durable, and compact booklight can be easily collapsed and stored inside the protective cover along with the eReader, thereby providing a booklight that is easily and conveniently carried or transported along with the eReader, while also protecting the booklight from damage. Thus, a user of an eReader can easily and conveniently illuminate the screen of the eReader in instances in which the level of ambient light is limited or reduced.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

Figure 1A:
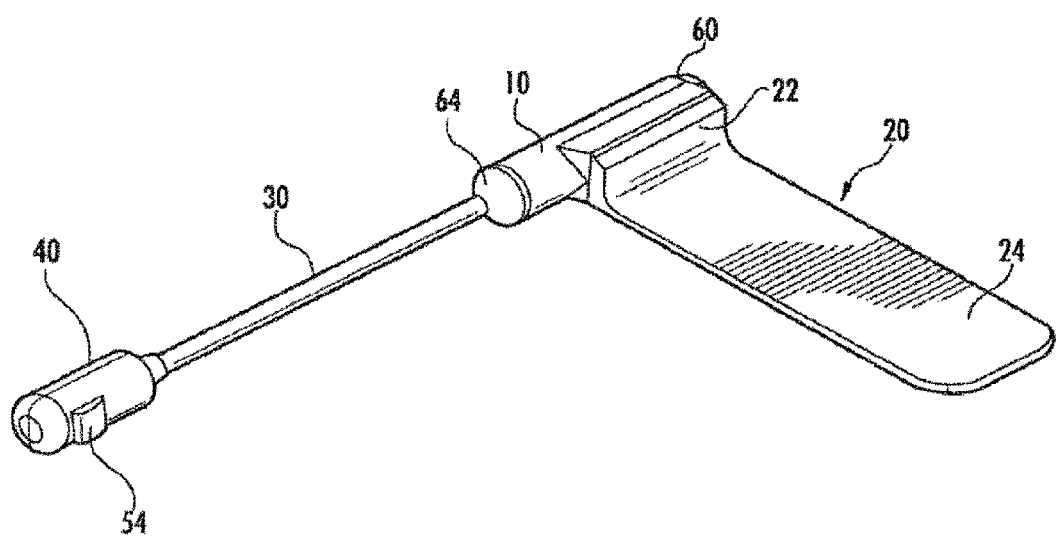
FIG. 1A illustrates an assembled perspective view of a booklight for an e-Reader according to an embodiment.
Figure 1B:
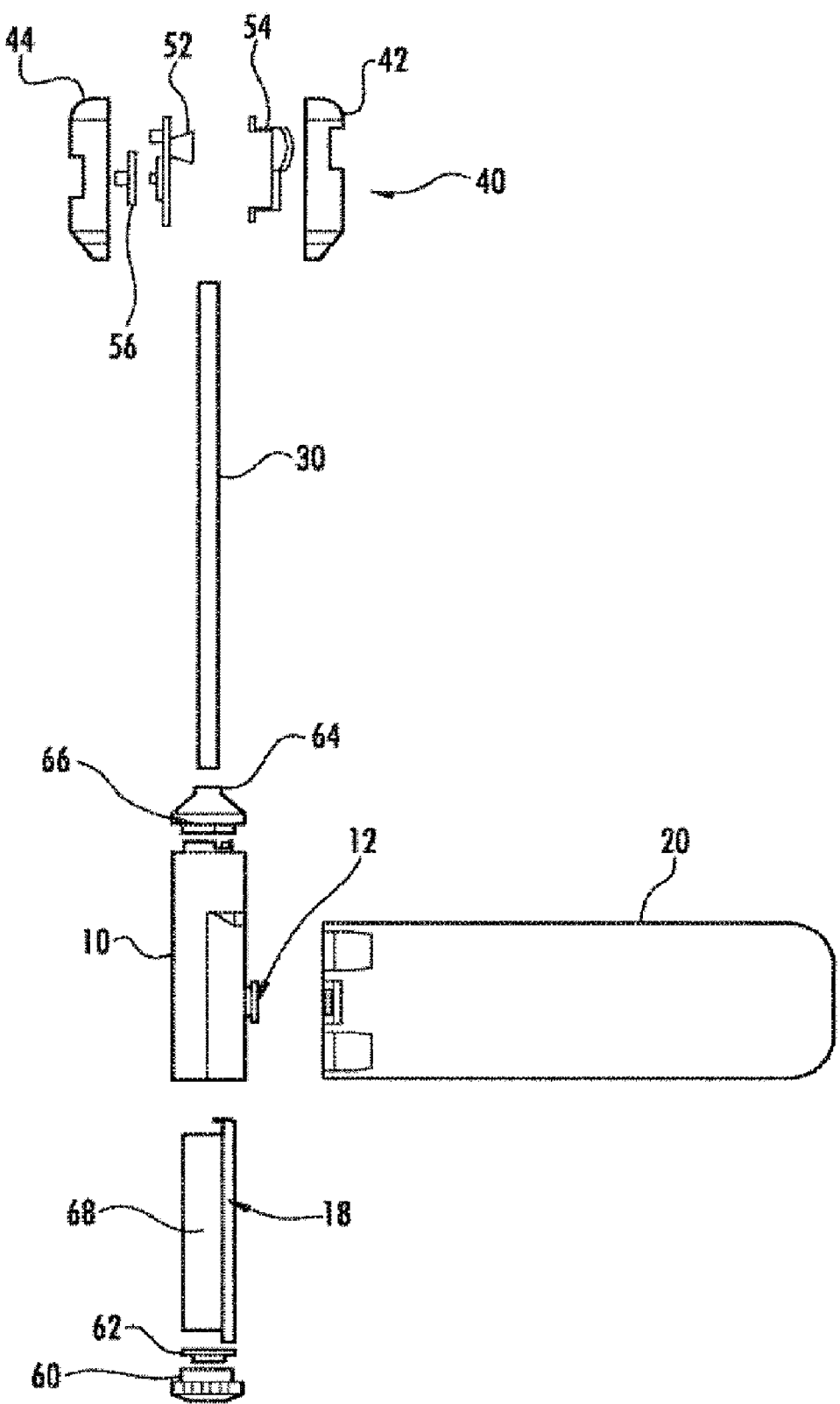
FIG. 1B illustrates an exploded view of the booklight of FIG. 1A.
Figure 2A:
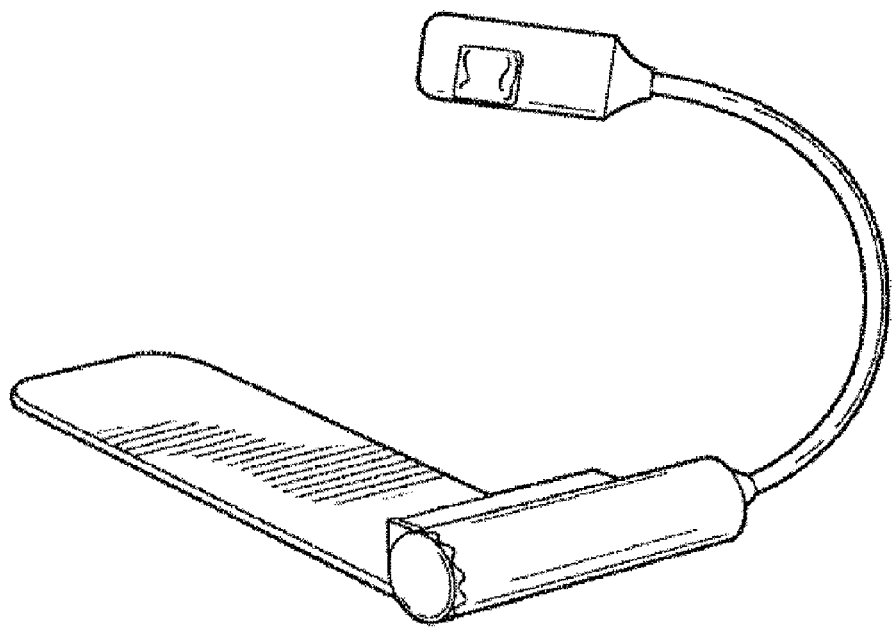
FIG. 2A-2D illustrate assembled perspective views of the booklight of FIGS. 1A and 1B.
Figure 2B:
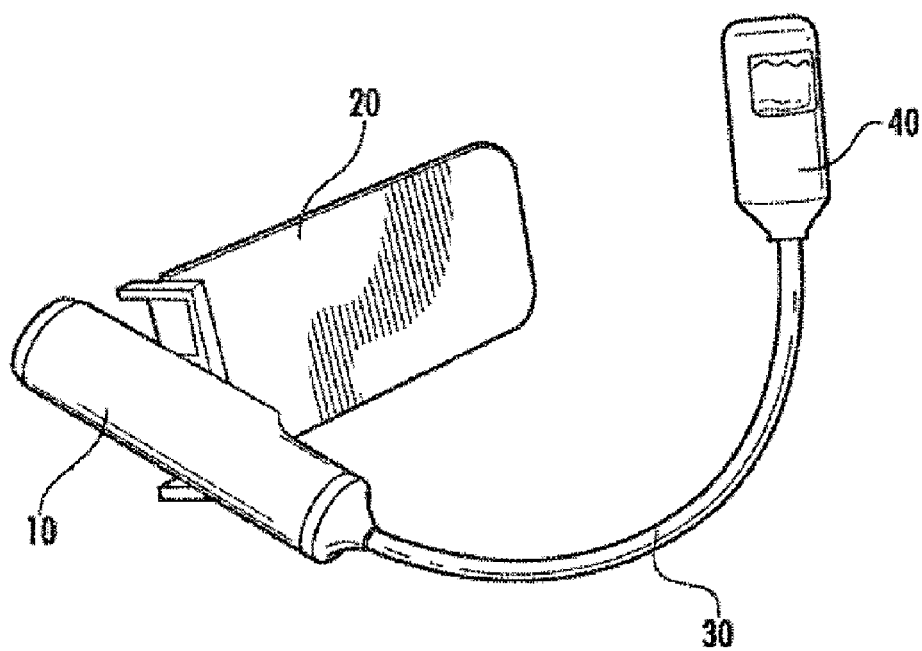
Figure 2C:
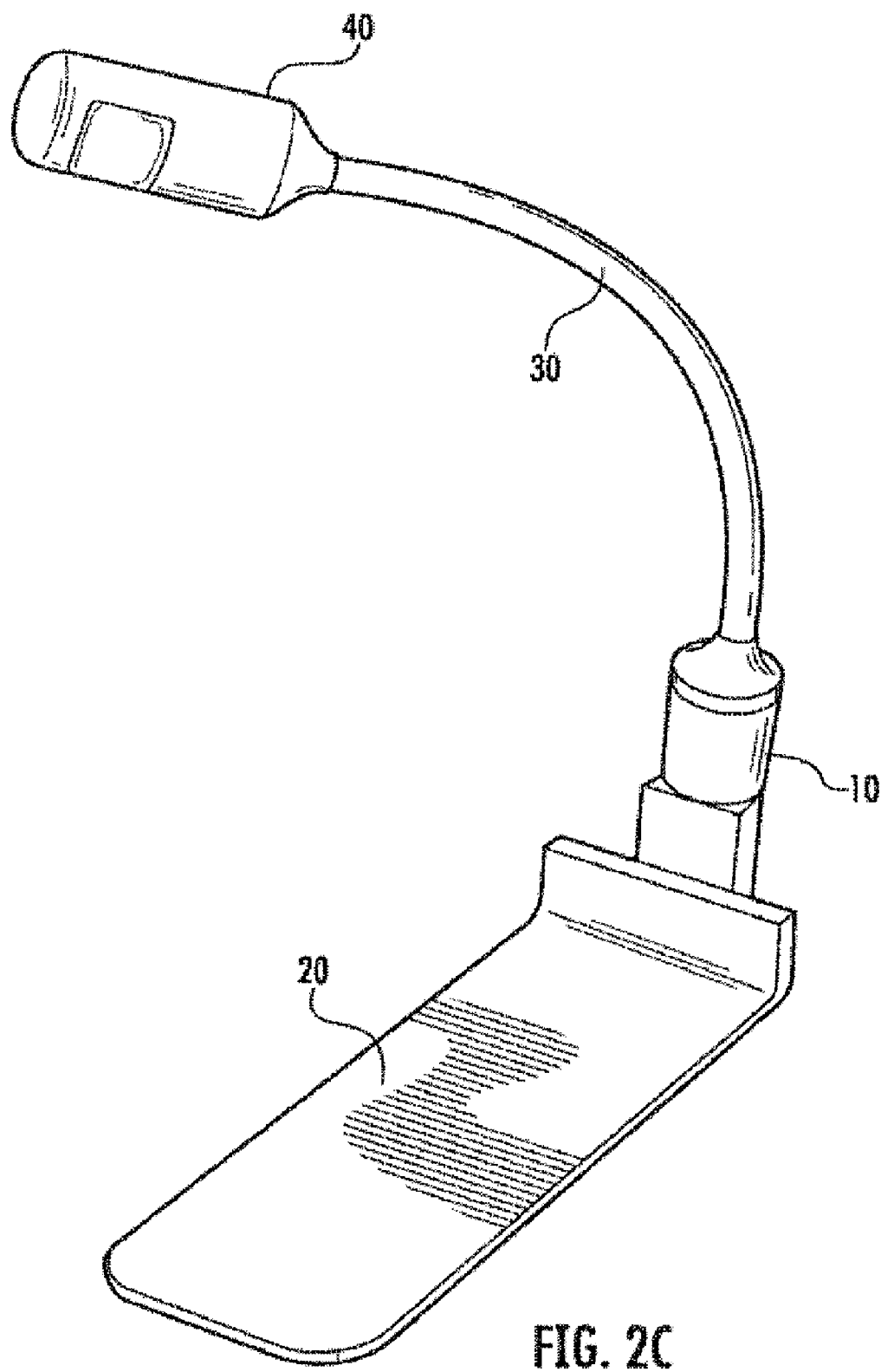
Figure 2D:
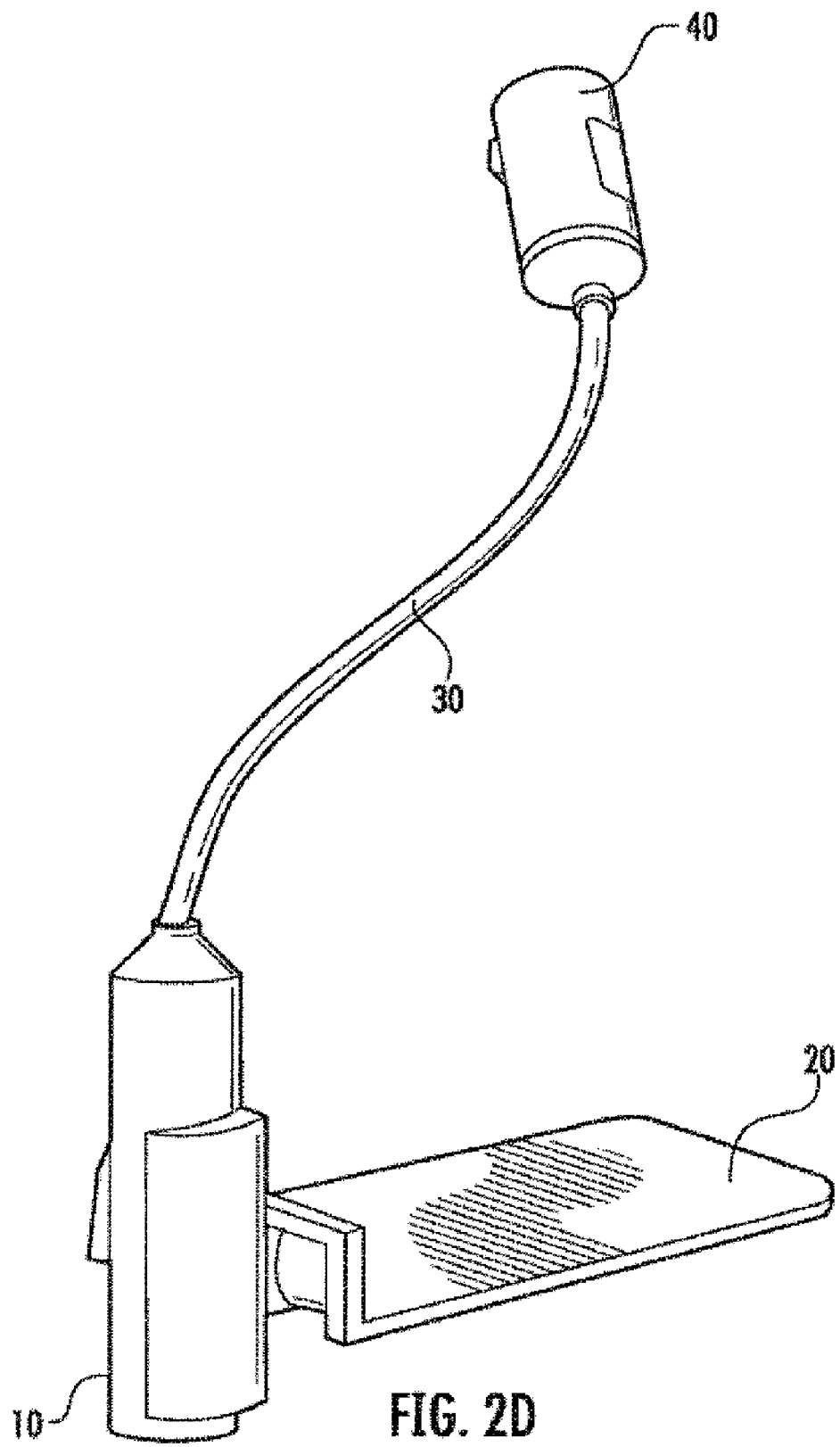

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1A-19D illustrate exemplary aspects of a booklight for an eReader.

As shown in FIGS. 1A-3D, an exemplary embodiment is directed to a booklight for a protective cover for an eReader. The exemplary booklight can be configured to work seamlessly and integrally with the protective cover of the eReader.

The exemplary booklight comprises a base, a light assembly housing 40 having a light source, a manipulatable neck 30 coupled between the base and the light housing assembly, and a base tab 20 rotatably coupled to the base. The base tab 20 can includes a first end 22 rotatably coupled to the base tab 20, and a second end 24 extending from the first end 22. As shown in FIG. 1A, the second end 24 is a free end 24. At least a portion of the free end 24 is configured to engage a pocket of the protective cover, as shown for example in FIG. 3A.

The light assembly housing 40, base 10, and base tab 20 can be constructed from lightweight durable ABS plastic or other suitable materials. The manipulatable neck 30 can be formed from plastic, metal, or other suitable materials.

A size and shape of a perimeter of the portion of the free end 24 substantially corresponds to a size and shape of the pocket of the protective cover. In an exemplary embodiment, the free end 24 includes a substantially flat plate portion configured to engage the pocket of the protective cover. In other embodiments, the base tab 20 can have other shapes, such as a rod-shape, a wire-shape, a wire-shape configured to form a perimeter surface corresponding to the shape of the pocket, etc.

As illustrated in FIGS. 2A-2D, the base tab 20 can be rotatable about an axis of rotation that is transverse to the longitudinal axis of the base 10. For example, in an exemplary embodiment, the first end 22 of the base tab 20 can be rotatably coupled to the base 10 by a swivel joint. In another exemplary embodiment, the first end 22 of the base tab 20 can be rotatably coupled to the base 10 by a ball and socket joint.

An exemplary embodiment of a protective cover 100 for an eReader is illustrated in FIGS. 3A-3D. The protective cover 100 can include, for example, a pocket for supporting the booklight. For example, the protective cover 100 can include a pocket 120 for receiving the base tab 20 of the booklight such that the booklight can be easily and effortlessly carried with the eReader, for example, at all times. The pocket 120 can be formed, for example, at an upper end of the interior surface of the rear cover 104 such that the book light can be positioned to extend from the upper end of the spine toward the lower end of the spine of the cover. In other embodiments, the pocket 120 can be formed at other locations on the interior of the rear cover 104, or at locations on the interior of the front cover 102. The pocket 120 can be formed on the same cover as the mounting system or on a different cover than the cover having the mounting system.

The pocket 120 can be integrally formed or sewn into the interior surface of the cover or coupled to the interior surface of the cover, for example, by another adhering means, such as using a glue, adhesive tape, etc.

The pocket 120 includes an open end 120a adjacent to the spine of the protective cover 100 for receiving the base tab 20 of a booklight. The pocket 120 can include a closed end 120b at an opposite end from the open end 120a. In other embodiments, both ends of the pocket can be open ends. A shape of the pocket 120 can be configured to correspond to a shape of the base tab 20 of the booklight.

Figure 3A:
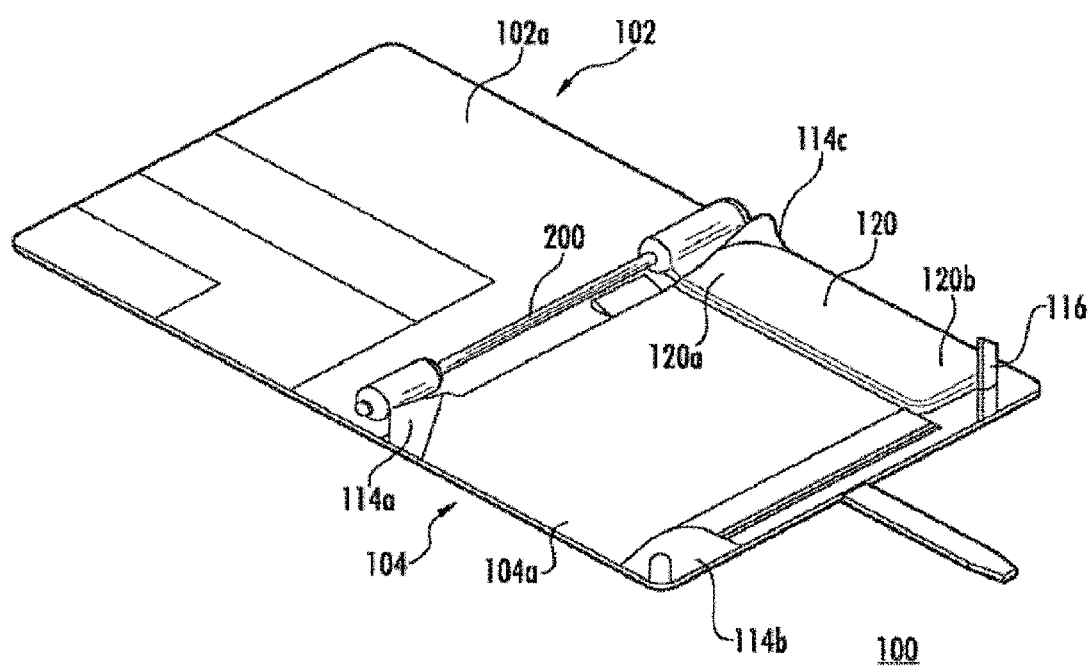
FIGS. 3A-3D illustrate perspective views of a cover assembly including the booklight of FIG. 1A assembled with a protective cover for an eReader.
Figure 3B:
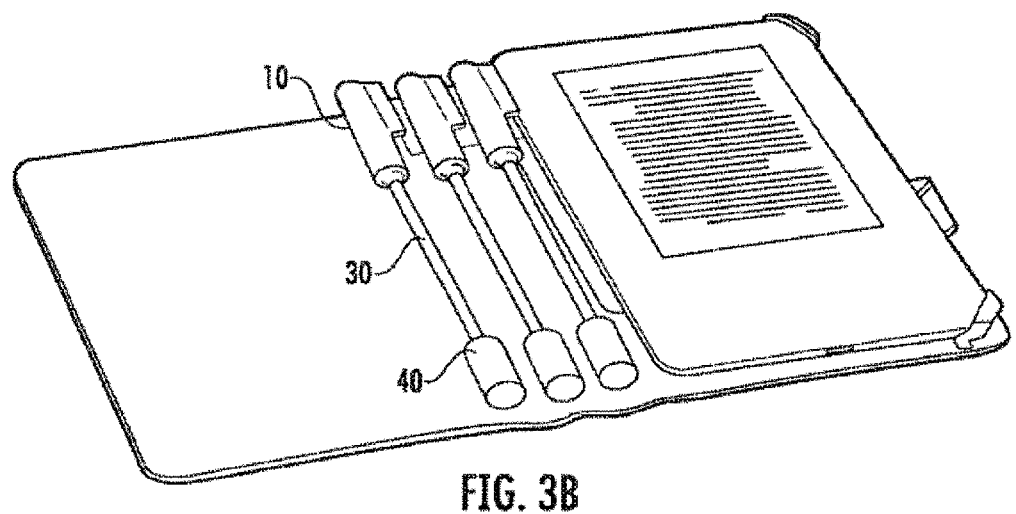
Figure 3C:
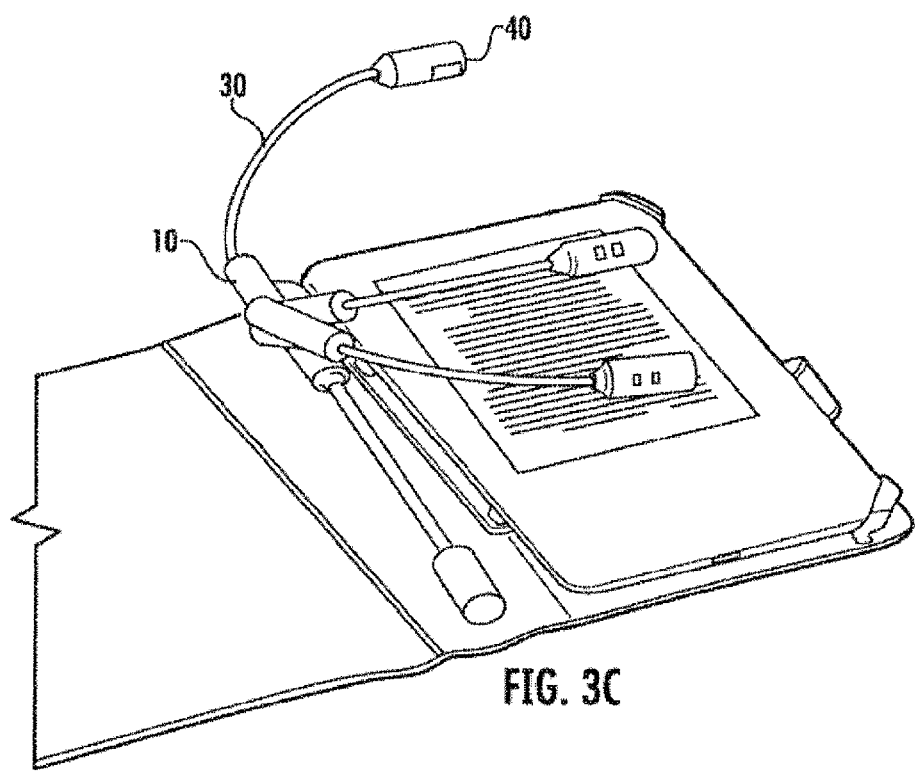
Figure 3D:
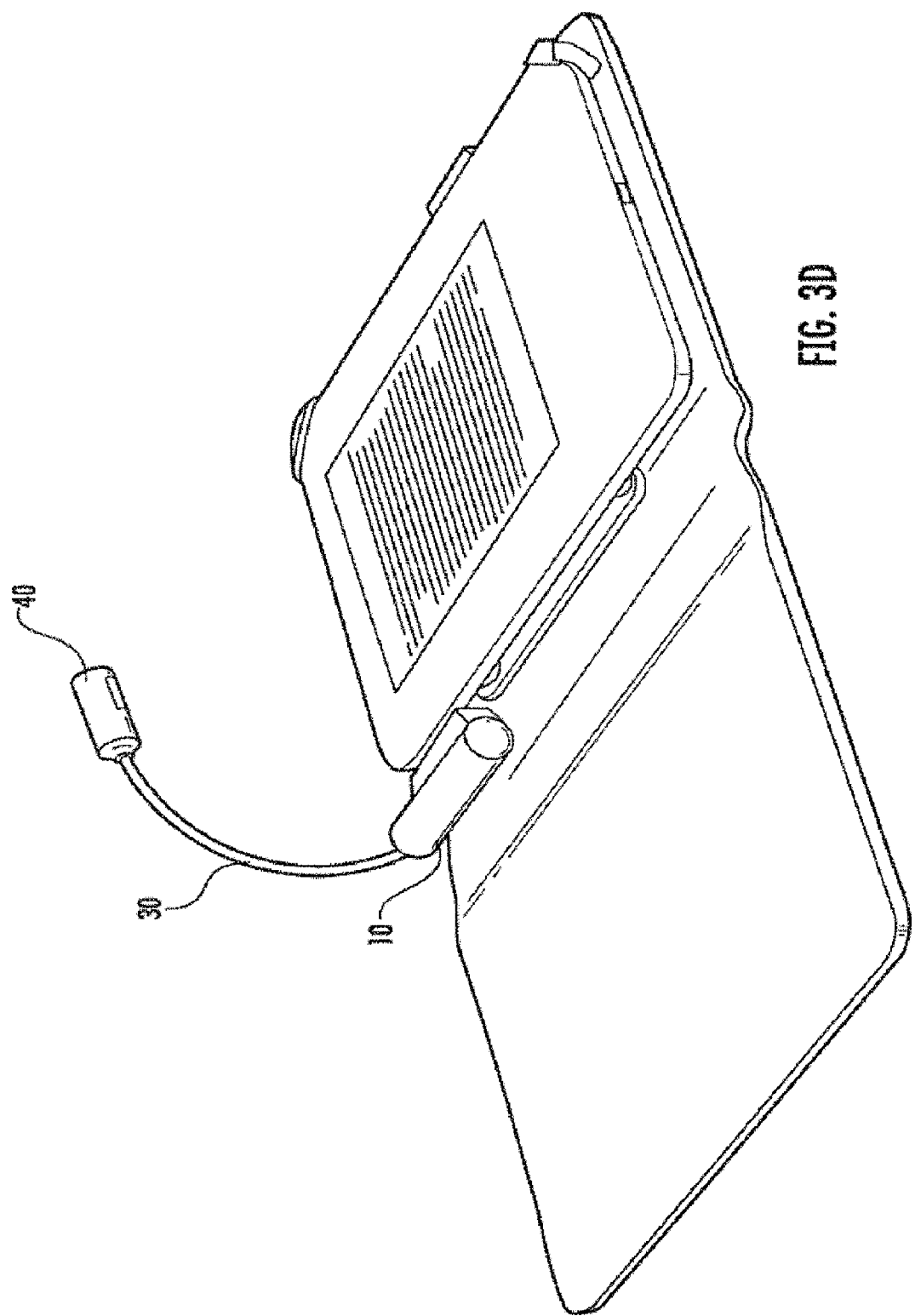

As shown in FIG. 3B, in operation, the base tab 20 of the booklight can be inserted into the pocket 120 until the booklight is positioned along the spine of the protective cover 100, thereby securing the booklight to the protective cover. In this manner, the protective cover 100 can seamlessly integrate and store the booklight within the protective cover 100 in the spine of the cover when the cover 100 is in the closed position. In this way, the present invention provides a protective cover 100 including an integral booklight that is compact and portable.

When the cover 100 is in the flat open position or the full open position, the light assembly housing 40 can be moved into a position to illuminate the display of the eReader in several ways. For example, the light assembly housing 40 can be moved into position to illuminate the display of the eReader by flexing or bending the manipulatable neck 30 of the booklight while the booklight is in the stored position. Additionally, as shown in FIG. 3B, the booklight can be pivoted or swiveled about the base tab 20, thereby moving the booklight from a stored position in which the booklight is aligned with the spine of the cover 100 and into an open position in which at least a portion of the booklight extends away from the cover 100 such that the booklight can be positioned to light the display of the eReader. The flexible neck 30 then can be moved into an optimal position to focus the light and illuminate the display of the eReader by flexing or bending the manipulatable neck 30 of the booklight while the booklight is in the open (i.e., pivoted or swiveled) position. The booklight can be pivoted or swiveled into numerous positions, depending on the desired position of the light housing assembly for illuminating the display of the eReader. The cover assembly of the booklight and the protective cover will be described in greater detail below.

With reference to FIGS. 4A-4E and 5A-5E, the base tab 20 and the base 10 of the booklight will now be described.

Figure 4A:
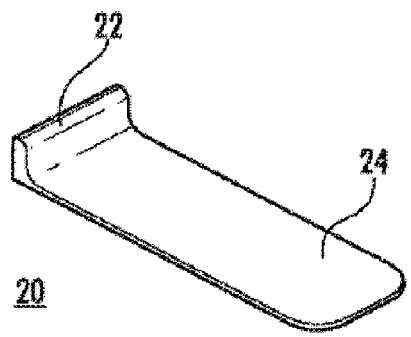
FIGS. 4A-4E illustrates an exploded and assembled view of a base tab of a booklight for an e-Reader according to an embodiment.
Figure 4B:
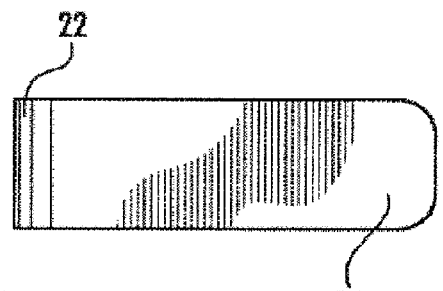
Figure 4C:
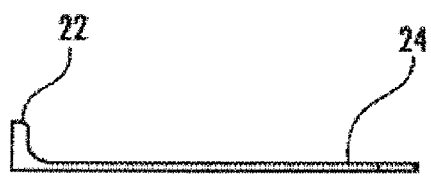
Figure 4D:
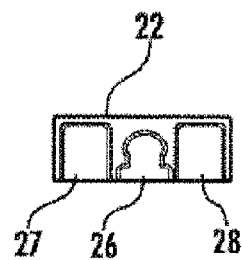
Figure 4E:
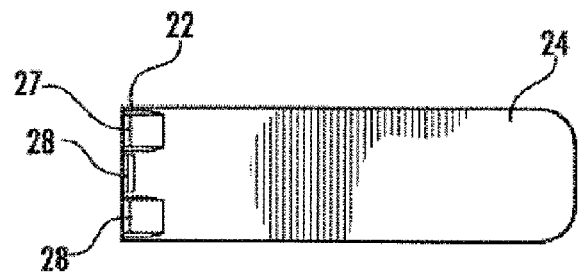

The base tab 20 can have a substantially L-shaped cross-section. In this embodiment, the free end 24 is substantially perpendicular to the fixed end. The first end 22 of the base tab 20 can include a front face on a side of the free end 24, and a rear face on an opposite side from the free end 24. As shown in FIG. 4D, the first end 22 of the base tab 20 includes a surface having a first slot 26 formed therein. For example, the rear face of the base tab 20 can include the first slot 26.

Figure 5A:
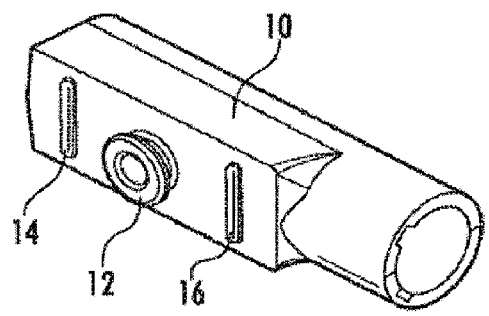
FIGS. 5A-5E illustrates an exploded and assembled view of a base of a booklight for an e-Reader according to an embodiment.
Figure 5B:
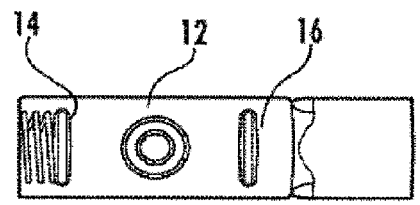
Figure 5C:
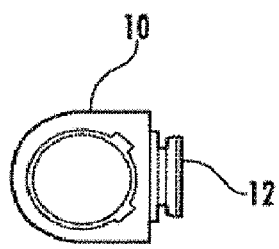
Figure 5D:
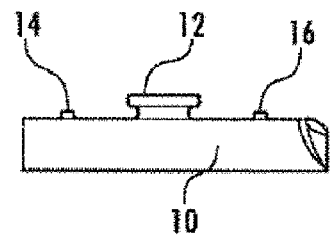
Figure 5E:
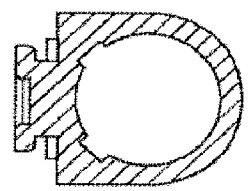

As shown in FIG. 5A, the body includes a base tab 20 mounting surface upon which the first end 22 of the base tab 20 can be rotatably coupled. The base tab 20 mounting surface can include a first protrusion 12 that corresponds to and engages the first slot 26 of the first end 22 of the base tab 20 in a manner such that the base tab 20 pivots about the first protrusion 12.

In the exemplary embodiment of FIGS. 5A-5E, the first protrusion 12 has a first portion having a first diameter and a second portion having a second diameter. The second portion interposes the base tab 20 mounting surface and the first portion. The first diameter of the first portion is greater than the second diameter of the second portion.

In the exemplary embodiment of FIGS. 4A-4E, the first slot 26 of the base tab 20 includes a first opening portion having a dimension that is one of equal to and greater than the first diameter of the first portion of the protrusion 12. The first slot 26 of the base tab 20 can include a second opening portion having a dimension that is one of equal to and greater than the second diameter of the second portion of the protrusion and less than the first diameter of the first portion of the protrusion 12.

Figure 6A:
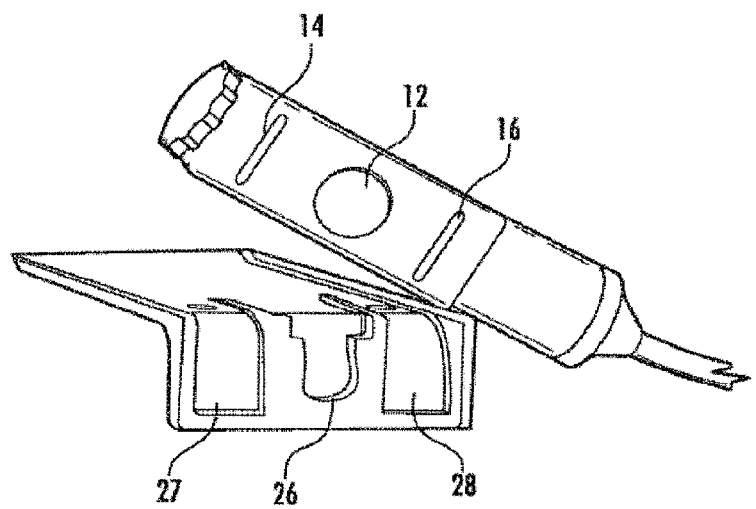
FIGS. 6A-6C illustrate partial perspective of a base and base tab according to an embodiment.
Figure 6B:
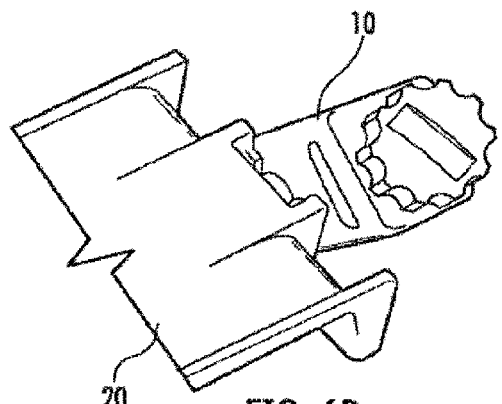
Figure 6C:
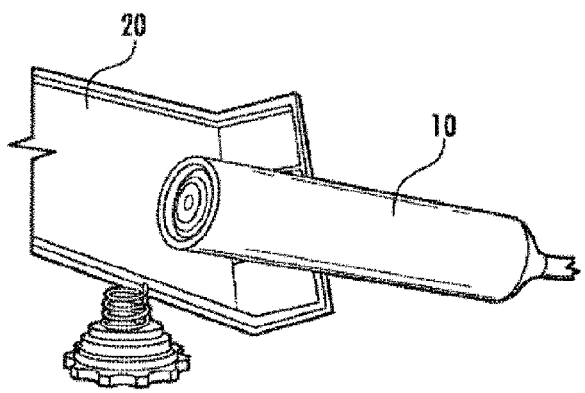

As illustrated in FIGS. 6A-6C, the first slot 26 can be open at one end and closed at the other end such that the protrusion 12 of the base tab 20 can be inserted into the larger diameter, open portion of the first slot 26 and moved into engagement with the smaller diameter, closed portion of the first slot 26. Alternatively, the first slot 26 can be closed at both ends, with one end having a larger diameter than the other end such that the protrusion 12 of the base tab 20 can be inserted into the larger diameter portion of the first slot 26 and moved into engagement with the smaller diameter portion of the first slot 26. In this manner, the protrusion 12 can be seated in the first slot 26 such that the base tab 20 pivots or swivels about the first protrusion 12 of the base 10.

It is noted that in another embodiment, the first slot 26 can be formed on the base 10 and the protrusion 12 can be formed on the base tab 20.

One of ordinary skill in the art will recognize that other arrangements for pivoting or swiveling the base tab 20 with respect to the base 10 are possible and are contemplated by the present application. For example, in another exemplary embodiment, the protrusion 12 can be a ball and the slot can be a socket for receiving the ball. In an exemplary embodiment, the socket can include flexible portions or fingers that flex or separate to receive the ball and then return to their original position to retain the ball in the socket.

With reference again to FIGS. 4A-4E and 5A-5E, in another embodiment, the surface of the first end 22 of the base tab 20 can include a second slot (e.g., 27) formed therein and adjacent to the first slot. The base tab 20 mounting surface can include a second protrusion (e.g., 14) that engages the second slot (e.g., 27) of the first end 22 when the base tab 20 is in a first pivot position, and does not engage the second slot (e.g., 27) of the first end 22 when the base tab 20 is in a pivot second position.

In the illustrated embodiment, the surface of the first end 22 of the base tab 20 includes a second slot 27 and a third slot 28 formed therein and adjacent to the first slot 26. The first slot 26 interposes the second slot 27 and the third slot 28. In this embodiment, the base tab 20 mounting surface includes a second protrusion 14 and a third protrusion 16 that engage respectively the second slot and the third slot of the first end 22 when the base tab 20 is in a first pivot position. The second protrusion and a third protrusion do not engage the second slot and the third slot of the first end 22 when the base tab 20 is in a second pivot position. In this manner, the base tab 20 can be retained in the closed position by the engagement of the second protrusion 14 and a third protrusion 16 with the second slot 27 and the third slot 28. By disengaging the protrusions 14, 16 from the slots 27, 28, the base tab 20 can be pivoted or swiveled into an un-stored position.

Figure 7A:
FIGS. 7A-7C illustrate a contact bar of a booklight according to an embodiment.
Figure 7B:
Figure 7C:
Figure 8A:
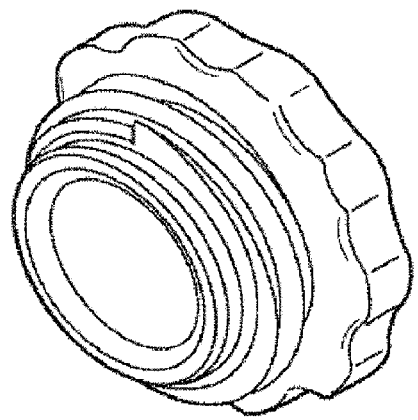
FIGS. 8A-8D illustrate a first cap of a booklight according to an embodiment.
Figure 8B:
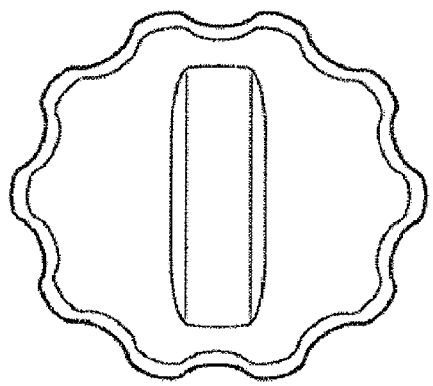
Figure 8C:
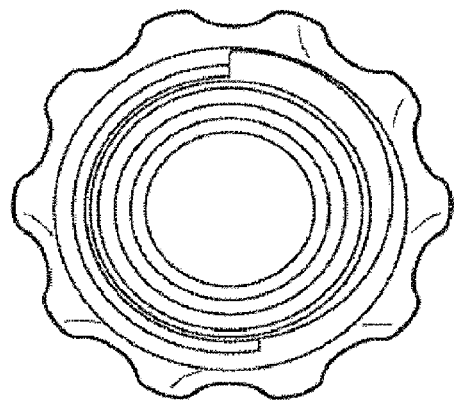
Figure 8D:
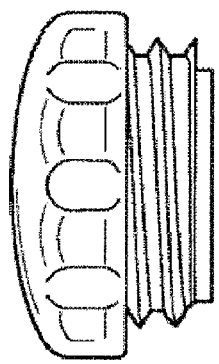
Figure 9A:
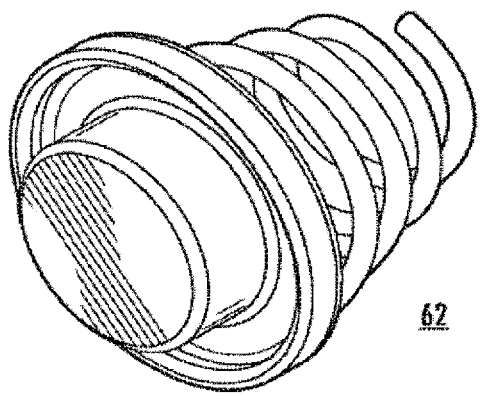
FIGS. 9A-9D illustrate a negative battery contact of a booklight according to an embodiment.
Figure 9B:
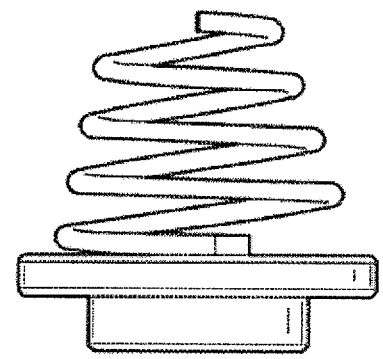
Figure 9C:
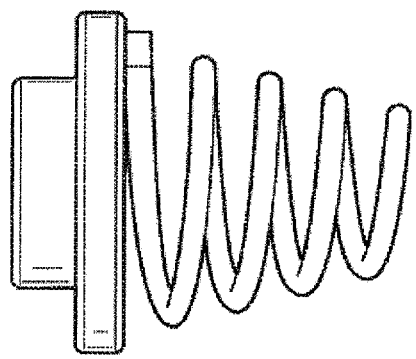
Figure 9D:
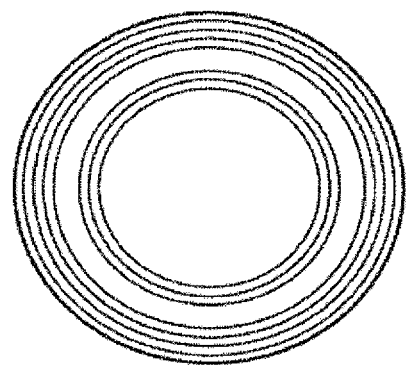
Figure 10A:
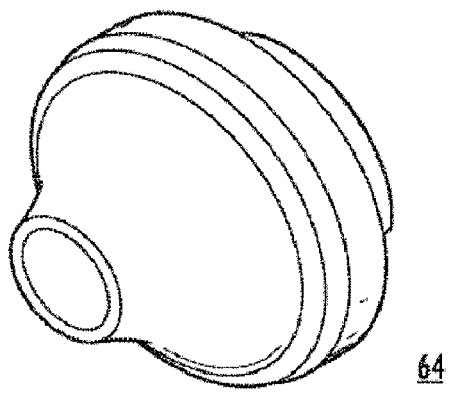
FIGS. 10A-10D illustrate a second cap of a booklight according to an embodiment.
Figure 10B:
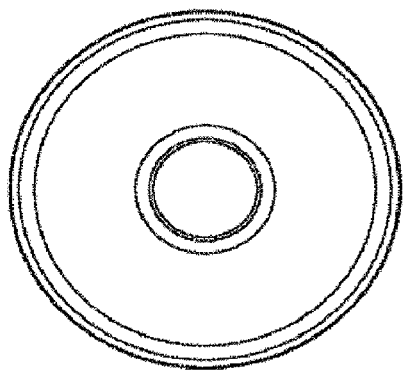
Figure 10C:
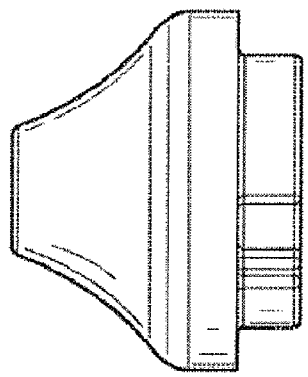
Figure 10D:
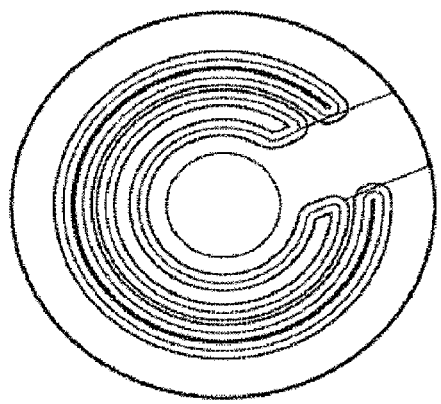
Figure 11A:
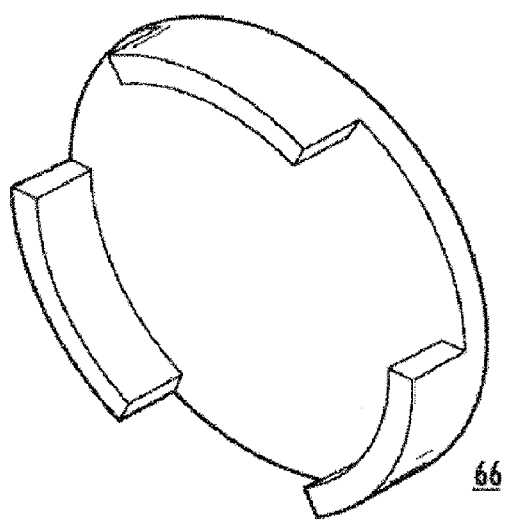
FIGS. 11A-11D illustrate a positive battery contact of a booklight according to an embodiment.
Figure 11B:
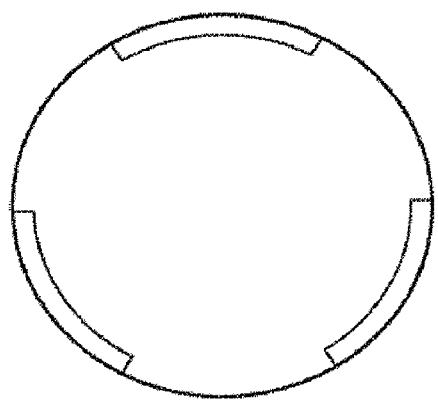
Figure 11C:
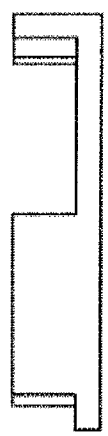
Figure 11D:

With reference again to FIGS. 5A-5E, the body can include a battery compartment configured to secure a battery 68 therein. The battery compartment includes an electrically conductive terminal, such as a contact bar 18, for electrically contacting the ends of the battery 68. An exemplary embodiment of the contact bar 18 is illustrated in FIGS. 7A-7C.

The exemplary embodiment can use, for example, a single standard AAA alkaline battery 68 which may provide endurance enough for more than 20 hours of operation of the light source. In other embodiments, other types and sizes of batteries can be used.

One of ordinary skill in the art will recognize that the embodiments are not limited to the battery 68 being stored in the base 10. In other embodiments, the battery 68 can be included in the light assembly housing 40 or another component.

The first end of the body 10 can include a first end cap 60 movable between an open position for accessing the battery compartment and a closed position for securing the battery 68 in the battery compartment. An exemplary embodiment of the first cap 60 is illustrated in FIGS. 8A-8D. The first end cap 60 can include a negative battery contact or terminal 62 as illustrated in FIGS. 9A-9D.

A second end of the body 10 can include a second end cap 64 that couples a first end of the manipulatable neck 30 to the second end of the body 10. An exemplary embodiment of the second end cap 64 is illustrated in FIGS. 10A-10D. The second end cap 64 can include a positive battery contact or terminal 66 as illustrated in FIGS. 11A-11D.

Figure 12A:
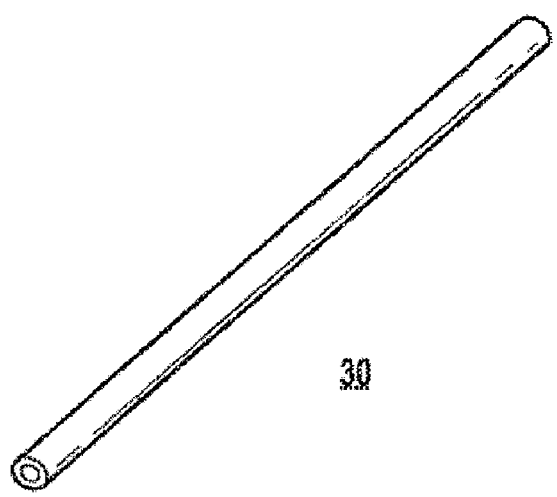
FIGS. 12A-12C illustrate a manipulatable neck of a booklight according to an embodiment.
Figure 12B:
Figure 12C:
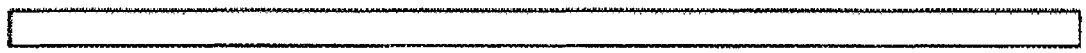

FIGS. 12A-12C illustrate a manipulatable neck 30 according to an embodiment of the invention. The manipulatable neck 30 can be manipulatable between a plurality of positions. The manipulatable neck 30 can be a flexible and resilient neck 30. The manipulatable neck 30 can be configured in numerous positions and is capable of retaining the manipulated position such that the light assembly housing 40 can be placed in an optimal position for illuminating the display of the eReader. In other embodiments, the manipulatable neck 30 can be formed from a series of links that are rotatable or pivotable with respect to each other.

In the illustrated embodiment, the manipulatable neck 30 includes a conductor extending along a length of the manipulatable neck 30. The first end of the conductor is electrically connected to the electrically conductive terminal (e.g., 18) of the body 10 and a second end of the conductor is electrically connected to a power input of the light assembly housing 40. The manipulatable neck 30 can be a hollow manipulatable neck 30 such that the conductor can extend along the length of the manipulatable neck 30 inside the hollow manipulatable neck 30.

With reference to FIGS. 13A-19D, an exemplary embodiment of a light assembly housing 40 will now be described.

As shown in FIGS. 13B, 14A-14D, and 15A-15D, an exemplary embodiment of the light assembly housing 40 can be formed by a first side 42 having a light source 50, and a second side 44 having a switch 56 for the light source 50. The light source 50 can include an incandescent light or a light emitting diode (LED), such as a SuperBright LED light. A printed circuit board 51 having the light source 50 mounted thereon, as illustrated for example in FIGS. 13B and 16A-16B, can be secured inside the light assembly housing 40.

With reference again to FIGS. 13B and 14A-14D, the first side 42 of the light assembly housing 40 can include an outer surface having an opening 46 formed therein. The light source 50 is disposed adjacent to the opening 46 and configured to emit light in a direction away from the light assembly housing 40. As explained above, the light source 50 can include a light emitting diode (LED).

As shown in FIGS. 13B and 17A-17E, an exemplary embodiment of the light assembly housing 40 can include a mirrored reflector 52 disposed adjacent to the opening 46 and configured to reflect and focus light emitted from the light source 50 in the direction away from the light assembly housing 40. As shown in FIGS. 13B and 18A-D, the light assembly housing 40 can include an optical lens 54 disposed one of in and over the opening 46 and along a light path of the light emitted from the light source 50. The optical lens 54 can include, for example, a dome-shaped optical lens (e.g., an optical quality dome lens). The lens 54 is not limited to a dome-shaped lens and lenses having other shapes and sizes are contemplated by the embodiments. The optical lens 54 can be selected to uniformly distribute the light emitted from the light source 50 in the direction away the light assembly housing 40.

As shown in FIGS. 13B and 19A-19D, the light assembly housing 40 can include a switch 56 for selecting among a plurality of light settings for the light source 50.

As shown in the exemplary embodiment of FIGS. 19a-19D, the switch 56 can be a slidable switch or slidable switch cover, such as a three-position switch, being selectable between a plurality of light intensity settings, such as a 'high' setting, a 'low' setting, and an 'off' setting. Each of the light intensity settings causes the light source 50 to emit a different level or quantity of light.

In other embodiments, the switch can be a toggle switch, a rotatable switch or knob, or a push button switch etc. having a plurality of light intensity settings, such as a 'high' setting, a 'low' setting, and an 'off' setting.

The embodiments are not limited to these light intensity settings. In other embodiments, the switch 56 can include a plurality of 'high' settings and/or a plurality of 'low' settings. For example, the plurality of light settings for the light source 50 includes an 'off' setting and at least two light intensity settings. In another embodiment, the plurality of light settings for the light source 50 includes an 'off' setting and at least three light intensity settings.

Figure 13A:
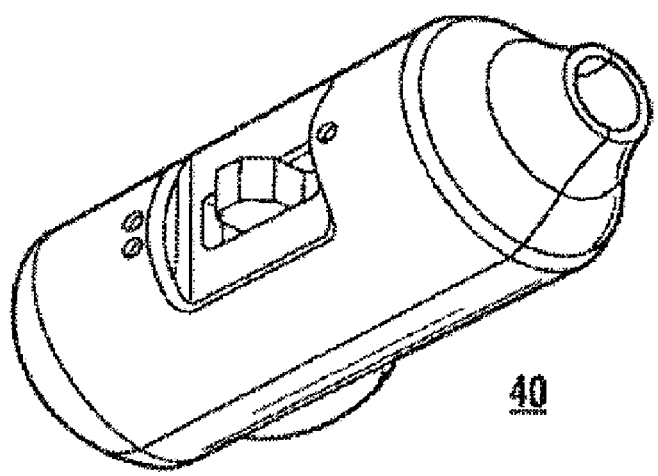
FIG. 13A illustrates an assembled view of a light assembly housing of a booklight according to an embodiment.
Figure 13B:
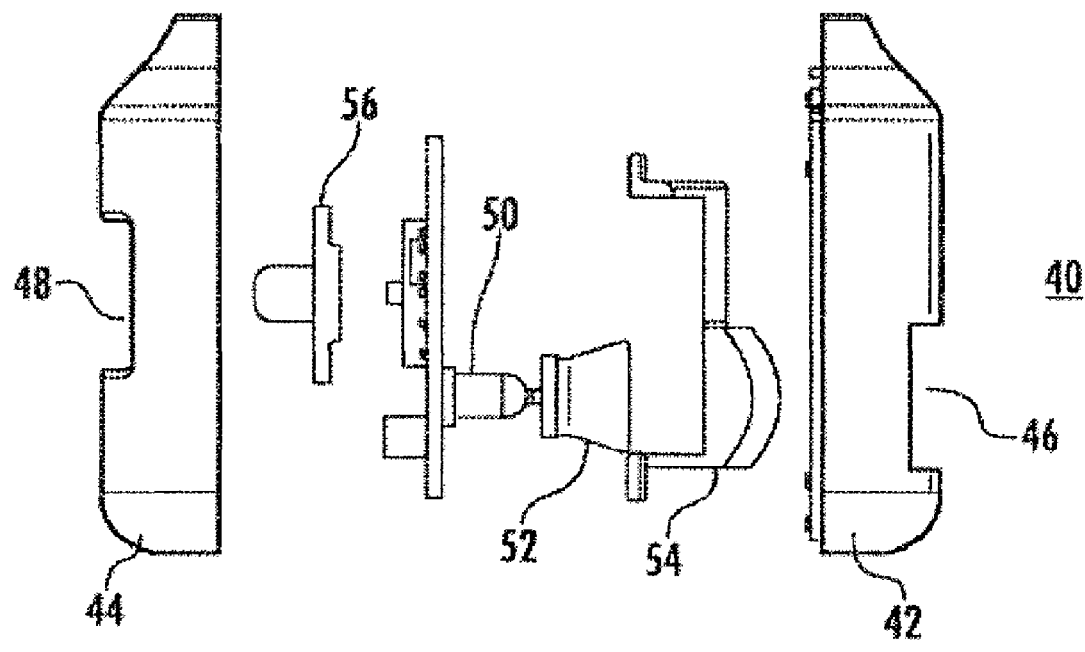
FIG. 13B illustrates an exploded view of the light assembly housing of FIG. 13A.
Figure 14A:
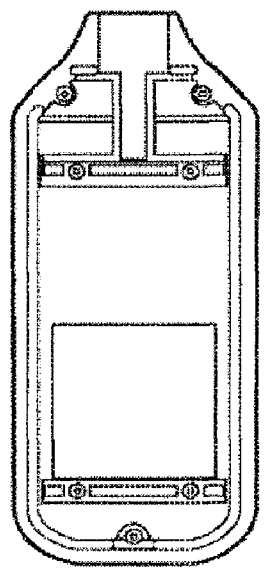
FIGS. 14A-14D illustrate views of a first side of a light assembly housing of FIG. 13A.
Figure 14B:
Figure 14C:
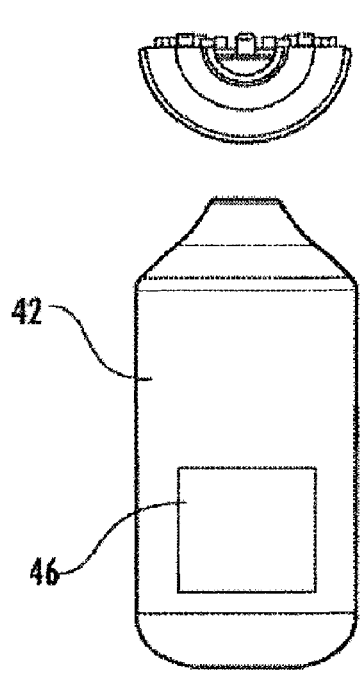
Figure 14D:
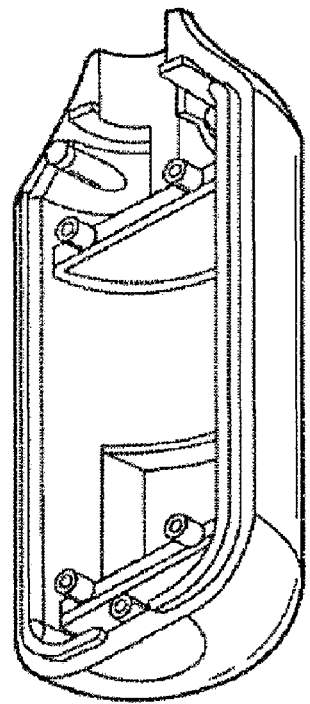
Figure 15A:
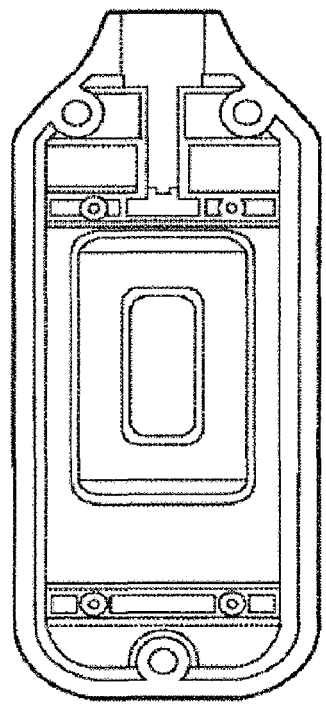
FIGS. 15A-15D illustrate views of a second side of a light assembly housing of FIG. 13A.
Figure 15B:
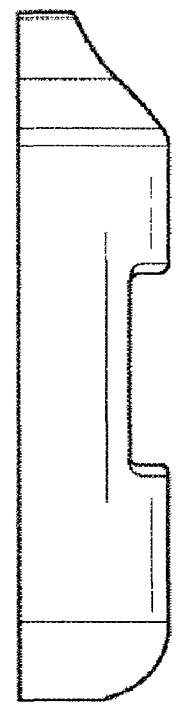
Figure 15C:
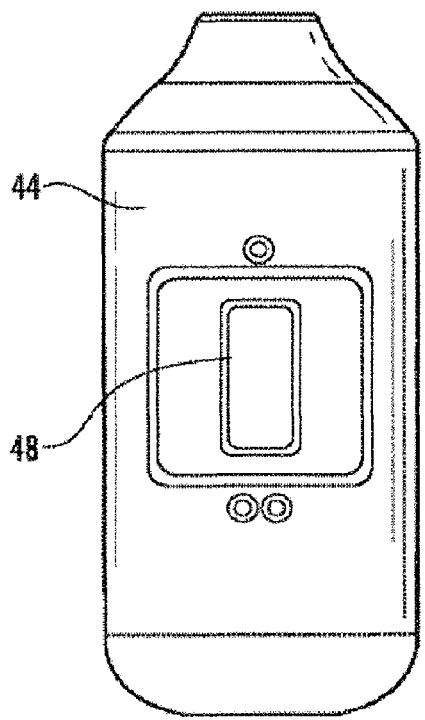
Figure 15D:
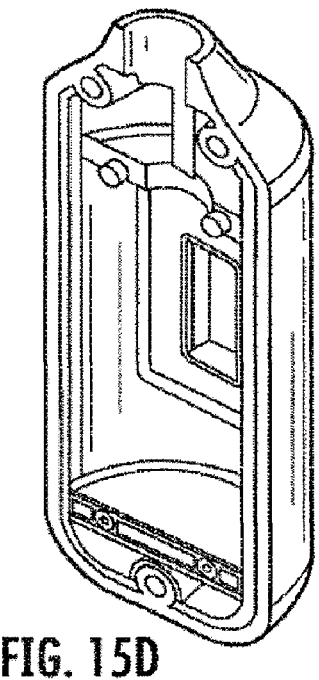
Figure 16A:
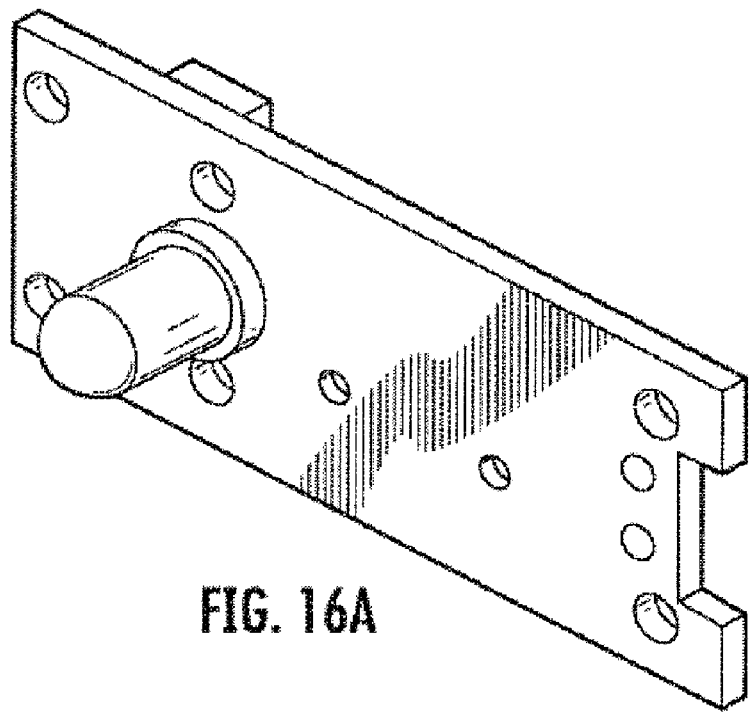
FIG. 16A-16B illustrate an assembled and exploded view of a printed circuit board (PCB) assembly of a booklight according to an embodiment.
Figure 16B:
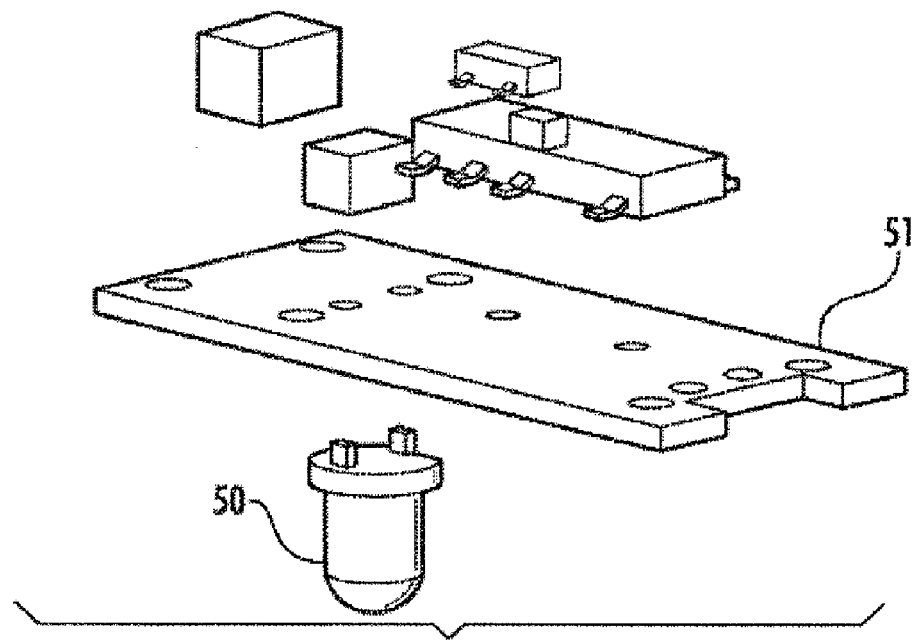
Figure 17A:
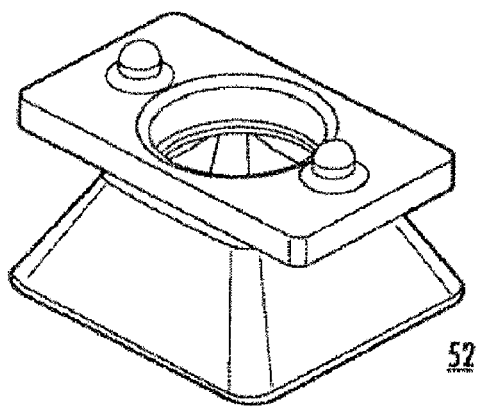
FIGS. 17A-17E illustrate views of a reflector a booklight according to an embodiment.
Figure 17B:
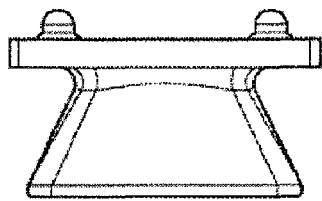
Figure 17C:
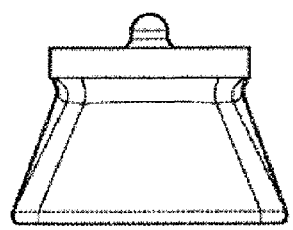
Figure 17D:
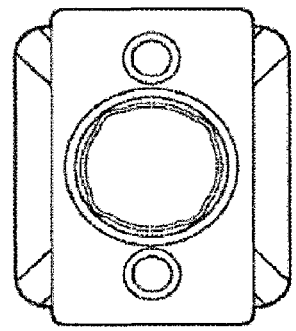
Figure 17E:
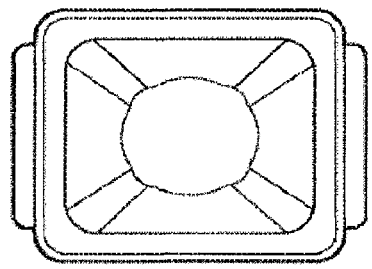
Figure 18A:
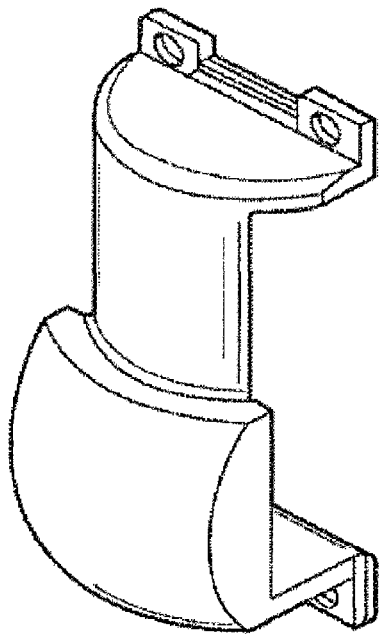
FIGS. 18A-18D illustrate views of an optical lens of a booklight according to an embodiment.
Figure 18B:
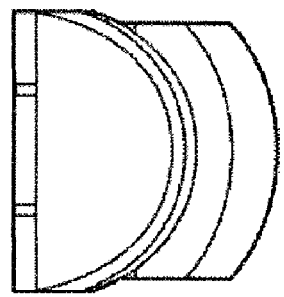
Figure 18C:
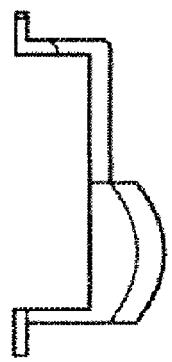
Figure 18D:
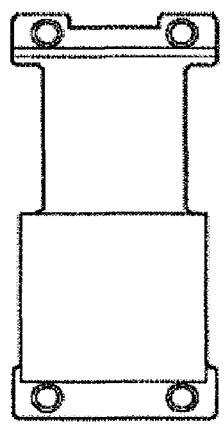
Figure 19A:
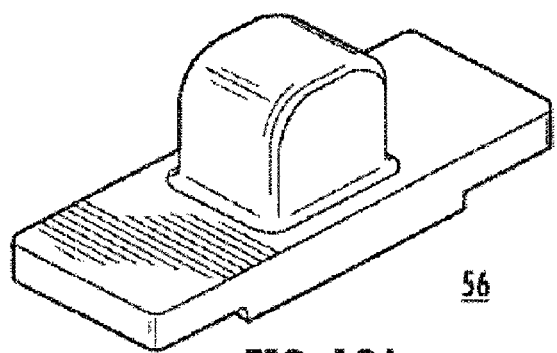
FIGS. 19A-19D illustrate views of a switch cover of a booklight for an e-Reader according to an embodiment.
Figure 19B:
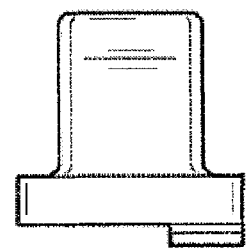
Figure 19C:
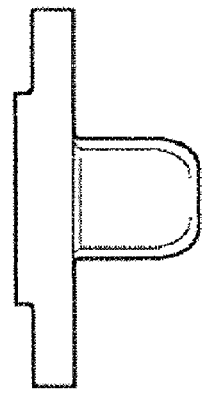
Figure 19D:
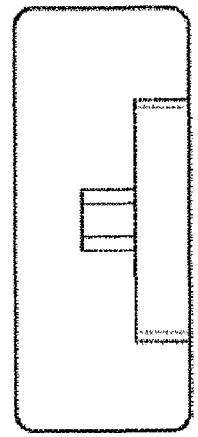

As illustrated in the exemplary embodiment of FIG. 13A, the switch 56 can be on the light assembly housing 40. In another embodiment (not shown), the switch can be on the base 10 and electrically connected to the light source 50 via an electrical conductor or wire extending from the base 10, through or along the manipulatable neck 30, and into the light assembly housing 40.

In another embodiment, a booklight for a protective cover for an eReader, wherein the protective cover includes a pocket for supporting the booklight, can include a base 10, a light assembly housing 40 having a light source, a manipulatable neck 30 coupled between the base 10 and the light assembly housing 40, and a base tab 20 coupled to the base 10. The base tab 20 includes a first end 22 coupled to the base tab 20, and a second end 24 extending from the first end 22, wherein the second end 24 is a free end, and wherein at least a portion of the free end 24 is configured to engage the pocket of the protective cover.

In this embodiment, the base tab 20 is not pivotable with respect to the base 10 of the booklight. In operation, the base tab 20 of the booklight is inserted into the pocket until the booklight lies along the spine of the protective cover, as shown for example in FIG. 3B. In this embodiment, the light assembly housing 40 can be moved into a position to illuminate the display of the eReader by flexing or bending the manipulatable neck 30 of the booklight while the booklight is in the fixed, stored position.

With reference again to FIGS. 3A-3D, another exemplary embodiment is directed to a cover assembly for an eReader, wherein the cover assembly includes a protective cover 100, and a booklight 200 removably secured to the protective cover. The protective cover 100 includes a first cover 104 having an interior and an exterior surface, a second cover 102 having an interior and an exterior surface, a spine connecting the first cover 104 to the second cover 102, wherein the first cover 104 and the second cover 104 are pivotable with respect each other about the spine, a mounting device 114a-c, 116 for securing the eReader on the interior surface 104a, 102a of one of the first cover 104 and the second cover 102, and a booklight pocket 120 on the interior surface 104a, 102a of one of the first cover 104 and the second cover 102. The booklight comprises a base 10, a light assembly housing 40 having a light source 50, a manipulatable neck 30 coupled between the base 10 and the light assembly housing 40, and a base tab 20 coupled to the base 10. The base tab 20 includes a first end 22 coupled to the base tab 20, and a second end 24 extending from the first end 22, wherein the second end 24 is a free end, and wherein at least a portion of the free end 24 engages the booklight pocket of the protective cover, thereby removably securing the booklight 200 to the protective cover 100.

A size and shape of a perimeter of the portion of the free end 24 substantially corresponds to a size and shape of the booklight pocket 120 of the protective cover 100. As explained above, the free end 24 includes a substantially flat plate portion that engages the booklight pocket 120 of the protective cover. In the exemplary embodiment, each of the mounting device 114a-c, 116 and the booklight pocket 120 are on the first cover 104. In this embodiment, the mounting device 114a-c, 116 secures the eReader over the booklight pocket 120 and the portion of the free end 24 of the base tab 20 when the eReader is secured to the interior surface 104a, 102a of the one of the first cover 104 and the second cover 102. In this manner, the mounting device 114a-c, 116 and the eReader secure, or at least help to secure, the base tab 20 of the booklight 200 in the booklight pocket 120 of the protective cover 100, thereby strengthening the assembly of the protective cover 100 and the booklight 200.

In other embodiments, the mounting device 114a-c, 116 and the booklight pocket 120 can be on separate covers 104 or 102.

As shown in FIG. 3A, the booklight pocket 120 is located adjacent to an upper end of the interior surface 104a, 102a of the one of the first cover 104a and the second cover 102. In this manner, the base 10, the manipulatable neck 30, and the light assembly housing 40 of the booklight 200 can be configured to be aligned serially along the spine of the protective cover 100 in a stored position inside the protective cover 100. The light assembly housing 40 can be easily and conveniently manipulated into position and/or the base 10 can be pivoted or swiveled into position, to focus the light from the booklight 200 and optimize the illumination of the display of the eReader.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

What is claimed is:

1. A cover assembly for an eReader comprising:
   a protective cover including:
      a first and second cover each including, an interior surface and an exterior surface,
      a spine connecting the first and second covers which are pivotable with respect to each other about the spine, and
      a pocket formed between the interior surface and the exterior surface of one of the first and second covers, wherein the pocket does not traverse the spine and extends away from the spine and has an opening formed at an edge of one of the interior surfaces,
   a booklight including,
      a base with a protrusion,
      a substantially flat portion that is disposed within the pocket formed between the interior surface and the exterior surface of one of the first and second covers, the substantially flat portion including a slot that receives the protrusion, so that the base is coupled with the substantially flat portion while the base is capable of moving relative to the substantially flat portion,
      a light housing assembly having a light source, and
      a neck between the base and the light housing assembly.

2. The cover assembly of claim 1, wherein the neck is a flexible neck.

3. The cover assembly of claim 1, wherein the light source includes a light emitting diode (LED).

4. The cover assembly of claim 1, wherein the interior surface further includes an axis and the interior surface is bendable around the axis, and
   wherein the pocket is formed at an angle with respect to the axis.

5. The cover assembly of claim 1, wherein the pocket is coupled to the interior surface.

6. A cover assembly for an eReader, comprising:
   a protective cover including a first and second cover each including,
      an interior surface, wherein a portion of the interior surface of one of the first and second covers is sized to secure the eReader, and
      an exterior surface
      the protective cover having an axis around which the interior surfaces of the first and second covers are bendable, and
      a pocket formed between the interior surface and the exterior surface of one of the first and second covers, the pocket not traversing the axis and being adjacent to an end of the interior surface and in the portion of the interior surface sized to secure the eReader, wherein the pocket is formed at an angle with respect to the axis; and
   a booklight including,
      a base coupled to a substantially flat portion that is disposed within the pocket, the substantially flat portion including a slot and the base including a protrusion received by the slot so that the base is movably coupled with the substantially flat portion,
      a light housing assembly having a light source, and
      a neck between the base and the light housing assembly.

7. The cover assembly for an eReader according to claim 6, wherein the pocket is coupled to the interior surface.

8. A cover and light assembly, the cover and light assembly comprising:
   a protective cover including, a first and second cover each including
      an exterior surface and an interior surface, and an axis around which the interior surfaces of the first and second covers are bendable, and
      a pocket formed between the exterior surface and at least a portion of the interior surface of one of the first and second covers, the pocket not traversing the axis and having an opening formed at an edge of the interior surface; and
   a light including,
      a planar base disposed within the pocket and having a slot,
      a movable base with a protrusion that is received by the slot of the planar base so that the movable base is movably coupled to the planar base,
      a neck extending from the movable base, and
      a light housing disposed at a distal end of the neck.

9. The cover and light assembly according to claim 8, wherein the movable base has a first position with respect to the planar base, and in the first position, the light housing is in a stored position.

10. The cover and light assembly according to claim 8, wherein the movable base has a second position with respect to the planar base, and in the second position, the light housing is in a lighting position.

11. The cover and light assembly according to claim 8, wherein the pocket is formed between the exterior surface and a corner portion of the interior surface.

12. The cover and light assembly according to claim 8, wherein the exterior cover is sized to wrap around an eReader.

13. The cover and light assembly according to claim 8, wherein the interior surface includes at least one mounting device disposed on the interior surface.

14. The cover and light assembly according to claim 8, wherein the interior surface and the exterior surface form a first cover and a second cover and the pocket is formed in one of the first cover and the second cover.

15. The cover and light assembly according to claim 8, wherein the pocket is formed at an angle with respect to the axis.

16. The cover and light assembly according to claim 8, wherein the pocket is coupled to the interior surface.

17. A cover and light assembly, the cover and light assembly comprising:
   a protective cover including, a first and second cover each including,
      an exterior surface, an interior surface, the protective cover having an axis around which the interior surfaces of the first and second covers are bendable, and a pocket formed between the exterior surface and a corner portion of the interior surface of one of the first and second covers and extending away from the axis, the pocket being formed with two opposing surfaces at an angle with respect to the axis, the pocket being formed with at least one opening at an end of the two opposing surfaces; and a light including, an elongated planar base disposed within the pocket between the two opposing surfaces of the pocket, the elongated planar base having a slot, the elongated planar base being sized to be received between the two opposing surfaces of the pocket and the at least one opening at the end of the two opposing surfaces, a movable base that moves with respect to the elongated planar base, the movable base having a protrusion that is received by the slot of the elongated planar base so that the movable base is movably coupled to the elongated planar base, a neck extending from the movable base, and a light housing disposed at a distal end of the neck and including a light adapted to light at least a portion of the interior surface of the cover, wherein the movable base has at least a first position and a second position with respect to the elongated planar base, and in the first position, the light housing is in a stored position, and in the second position, the light housing is in a lighting position.

* * * * *